United States Patent
Bernal et al.

(10) Patent No.: US 9,412,185 B2
(45) Date of Patent: *Aug. 9, 2016

(54) RECONSTRUCTING AN IMAGE OF A SCENE CAPTURED USING A COMPRESSED SENSING DEVICE

(71) Applicant: Xerox Corporation, Norwalk, CT (US)

(72) Inventors: Edgar A. Bernal, Webster, NY (US); Beilei Xu, Penfield, NY (US); Lalit Keshav Mestha, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/753,238

(22) Filed: Jun. 29, 2015

(65) Prior Publication Data
US 2015/0317806 A1  Nov. 5, 2015

Related U.S. Application Data

(63) Continuation of application No. 13/932,791, filed on Jul. 1, 2013, now Pat. No. 9,070,218.

(51) Int. Cl.
- *G06T 11/00* (2006.01)
- *G06T 7/00* (2006.01)
- *G06T 1/00* (2006.01)
- *H04N 5/225* (2006.01)

(52) U.S. Cl.
CPC ............ *G06T 11/006* (2013.01); *G06T 1/0007* (2013.01); *G06T 7/0081* (2013.01); *H04N 5/225* (2013.01); *G06T 2207/10004* (2013.01); *G06T 2207/20052* (2013.01)

(58) Field of Classification Search
CPC ... G06T 11/006; G06T 11/003; G06T 1/0007; G06K 9/3233; H03M 7/30; H04L 25/20; H04N 5/235; H04N 5/23235; H04N 5/2351; H04N 5/2354; H04N 5/238; H04N 5/243; H04N 5/351; H04N 5/335; H04N 5/225; H04N 3/08; G02B 26/0833
USPC ........... 348/222.1, 135, 241, 227.1, 294, 335, 348/344, 239, 296–297, 362–363, 367, 348/370–371
See application file for complete search history.

(56) References Cited

U.S. PATENT DOCUMENTS

| | | | | |
|---|---|---|---|---|
| 7,602,183 | B2* | 10/2009 | Lustig | G01R 33/561 324/307 |
| 8,199,244 | B2* | 6/2012 | Baraniuk | H04L 25/20 348/335 |

(Continued)

OTHER PUBLICATIONS

Bauchert et al., "Advances in liquid crystal spatial light modulators", Society of Photo Instrumentation Engineers, 2002.

(Continued)

*Primary Examiner* — Pritham Prabhakher
(74) *Attorney, Agent, or Firm* — Philip E. Blair; Fleit Gibbons Gutman Bongini & Bianco P.L.

(57) ABSTRACT

A method for reconstructing an image of a scene captured using a compressed sensing device. A mask is received which identifies at least one region of interest in an image of a scene. Measurements are then obtained of the scene using a compressed sensing device comprising, at least in part, a spatial light modulator configuring a plurality of spatial patterns according to a set of basis functions each having a different spatial resolution. A spatial resolution is adaptively modified according to the mask. Each pattern focuses incoming light of the scene onto a detector which samples sequential measurements of light. These measurements comprise a sequence of projection coefficients corresponding to the scene. Thereafter, an appearance of the scene is reconstructed utilizing a compressed sensing framework which reconstructs the image from the sequence of projection coefficients.

16 Claims, 7 Drawing Sheets

(56) References Cited

U.S. PATENT DOCUMENTS

| | | | | |
|---|---|---|---|---|
| 8,566,053 | B2* | 10/2013 | Baraniuk | H03L 7/07 702/66 |
| 8,570,405 | B2 | 10/2013 | Kelly et al. | |
| 8,717,484 | B2 | 5/2014 | McMackin et al. | |
| 8,717,551 | B2* | 5/2014 | Baraniuk | G01J 3/2823 356/121 |
| 8,860,835 | B2 | 10/2014 | Kelly et al. | |
| 8,907,280 | B1* | 12/2014 | Larson | G01N 23/225 250/307 |
| 2006/0239336 | A1 | 10/2006 | Baraniuk et al. | |
| 2012/0016921 | A1* | 1/2012 | Davenport | H03M 7/30 708/322 |
| 2012/0038786 | A1* | 2/2012 | Kelly | G02B 26/0833 348/222.1 |
| 2012/0038805 | A1* | 2/2012 | Kelly | G02B 26/0833 348/300 |
| 2012/0038819 | A1* | 2/2012 | McMackin | H04N 5/335 348/369 |
| 2013/0083312 | A1* | 4/2013 | Baraniuk | G01J 3/2823 356/51 |

OTHER PUBLICATIONS

Candes, Emmanuel J., "Compressive sampling", Proceedings of the International Congress of Mathematicians, Madrid, Spain, 2006.

Candes et al., "Robust Uncertainty Principles: Exact Signal Reconstruction from Highly Incomplete Frequency Information", Jun. 2004.

Dudley et al., "Emerging Digital Micromirror Device (DMD) Applications", Society of Photo-Optical Instrumentation Engineers, 2003.

In-View Technology Corporation, "CS Camera Technology How a Compressive Sensing Camera Works", 2013.

Jenoptik, "Liquid Crystal Spatial Light Modulators", Aug. 2012.

Li et al., "Visual attention guided bit allocation in video compression", Image and Vision Computing 29, 2011.

Robucci et al., "Compressive Sensing on a CMOS Separable-Transform Image Sensor", Proceedings on IEEE, Apr. 22, 2009.

Wen et al., "Low Bit-Rate Video Streaming for Face-To-Face Teleconference", Proceedings on IEEE, 2004.

Batlle et al., "Recent Progess in Coded Structured Light as a Technique to Solve the Correspondence Problem: A Survey", Pattern Recognition, vol. 31, No. 7, 1998, pp. 963-982.

Babacan et al., "Compressive Light Field Sensing", Dec. 2012, IEEE Transactions on Image Processing, vol. 21, No. 12, p. 4746-4757.

Duarte et al., "Single-Pixel Imaging Via Compressive Sampling", Mar. 2008, IEEE Signal Processing Magazine, pp. 83-91.

Wakin et al., "An Architecture for Compressive Imaging", 2006, IEEE International Conference on Image Processing, pp. 1273-1276.

* cited by examiner

RECONSTRUCTING AN IMAGE OF A SCENE CAPTURED USING A COMPRESSED SENSING DEVICE

TECHNICAL FIELD

The present invention is directed to systems and methods which use a compressed sensing framework to process an image of a scene captured using a compressed sensing device such that when the image is reconstructed pixels associated with one or more regions of interest in that scene are rendered at a higher quality relative to other pixels in that image.

BACKGROUND

Adaptive-quality image and video compression is a well-known art whereby variable amounts of bits are allocated to different spatial and/or temporal portions of the data to be compressed depending on the variable quality requirements of the particular application. Traditional approaches take as input uncompressed images or videos of a scene, determine the locations of regions of interest (based, for example, on visual saliency or on the requirements of the particular application, for example, teleconferencing) in the scene, and re-compress the image or video more efficiently (from a perceptual or application standpoint) by allocating larger amounts of bits to the regions of interest. The disadvantage of these traditional approaches is that they are wasteful since the original data is typically already compressed (for example, at acquisition), which requires performing decompression and adaptive re-compression. Compressive sensing technologies, on the other hand, are capable of performing image and/or video acquisition and compression simultaneously. Compressive sensing can be beneficial because it reduces the number of samples required to spatially and/or temporally reconstruct a given scene, thus enabling the use of inexpensive sensors with reduced spatial and/or temporal resolution in applications where complex sensors are otherwise used, while maintaining the quality of the reconstructed scene. To date, however, compressive sensing techniques with adaptive quality capabilities have not been proposed. What is desirable therefore are methods that can simultaneously offer the benefits provided by compressive sensing while at the same time enabling adaptive quality scene reconstruction. This is of particular interest in applications where the video camera is a multi-spectral or hyperspectral imaging system where the spatial sensor is expensive to manufacture.

Accordingly, what is needed in this art are increasingly sophisticated systems and methods which use a compressed sensing framework to process an image of a scene captured using a compressed sensing device such that when the image is reconstructed pixels associated with one or more regions of interest in that scene are rendered at a higher quality relative to other pixels in that image.

BRIEF SUMMARY

What is disclosed is a system and method for adaptive-resolution scene reconstruction wherein a region of interest within a scene can be rendered at higher quality relative to the rest of that scene. The present method performs an adaptive compression simultaneously with image acquisition to increase image processing performance while maintaining the features and advantages of a compressive sensing system.

In one embodiment, the present method for reconstructing an image of a scene captured using a compressed sensing device involves the following. A mask is received wherein pixels of an image of a scene associated with one or more regions of interest are marked as being ON and pixels not associated with the region of interest are marked as being OFF. Measurements are then obtained of the scene using a compressed sensing device comprising, at least in part, a spatial light modulator configuring a plurality of spatial patterns according to a set of basis functions each having spatially varying spatial resolution. It should be understood that the basis functions all have the same resolution at a given spatial location (that is, for given pixel coordinates,) but can have varying spatial resolution (that is, the resolution can vary depending on the location within the basis function.) A spatial resolution of the basis functions is adaptively modified according to attributes of the mask. For example, when the pixels on the upper half of the mask associated with the region of interest are ON, the basis functions can have twice the resolution in the upper half of the image relative to the lower half, in which case, all the basis functions would have varying spatial resolution. In more general embodiments, the mask has more than two values and different regions of interest are reconstructed with different spatial resolutions. In one extreme case, areas of the scene that are outside the regions of interest are not reconstructed at all, or, equivalently, have zero spatial resolution, so that targeted region of interest reconstruction is achieved. Each pattern configured by the spatial light modulator focuses approximately half of the incoming light of the scene onto a detector which samples sequential measurements of light focused thereon by the pattern. Each of the measurements comprises an inner product result $y_m = <x, \phi_m>$, where $x[\ ]$ denotes an N-dimension vector representing the N-pixel sampled version of the scene, with possibly varying resolution and $\phi_m[\ ]$ denotes the $m^{th}$ incoherent basis function used for sampling. A series of measurements comprise a sequence of projection coefficients corresponding to the inner product between the scene and the different basis functions. Thereafter, an appearance of the scene is reconstructed utilizing a compressed sensing framework which reconstructs the image from the sequence of projection coefficients after M inner products have been sampled, where M is smaller than N. The reconstruction is such that pixels associated with the identified region(s) of interest have a higher image quality when rendered relative to other pixels of the image.

Many features and advantages of the above-described system and method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for adaptive-resolution scene reconstruction wherein a region of interest within a scene can be rendered at higher quality relative to the rest of that scene. Adaptive compression is performed simultaneously with image acquisition to increase image processing performance and throughput.

NON-LIMITING DEFINITIONS

An "image" of a scene, as is generally understood, comprises a two dimensional grid of pixels with each pixel having an associated location along that grid, and an intensity value as detected by imaging elements of a photodetector.

A "region of interest" of a scene is an identified portion of that scene which is intended to be reconstructed using the teachings disclosed herein. What defines a particular area of interest will largely depend on the application where the present invention finds its intended uses. For example, for use in healthcare systems, the region of interest may be a localized area near vascular pathways of a patient's hand or face. In other contexts, the region of interest may be a patient's neck, thoracic region, a foot or leg, etc. The region of interest may be identified using a variety of techniques known in the arts including: pixel classification, object identification, facial recognition, color, texture, spatial features, spectral information, pattern recognition, and a user input.

Figure 1A:
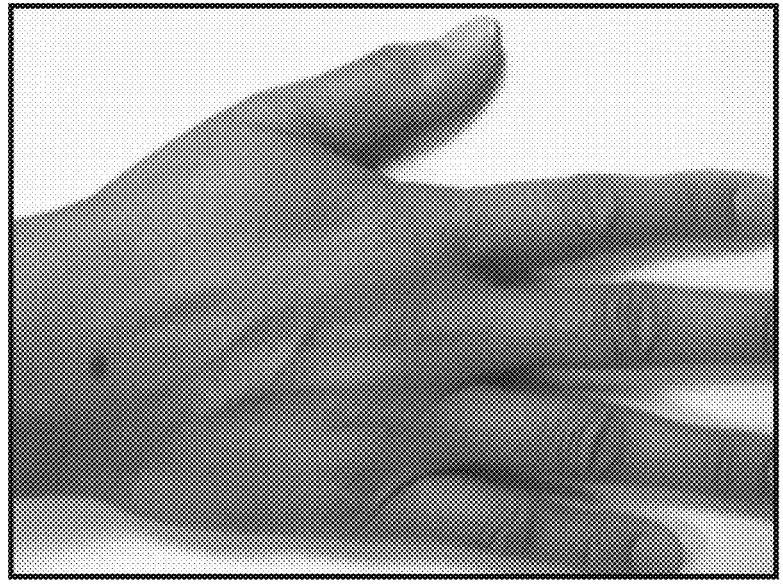
FIG. 1A shows an image of a human hand.
Figure 1B:
FIG. 1B shows an example mask corresponding to the vascular pattern of the hand of FIG. 1A.

A "mask" identifies at least one region of interest in an image of a scene. In one embodiment, pixels associated with the identified region of interest are identified in the mask as being 'active' and pixels which are outside the region of interest are 'inactive'. FIG. 1B shows an example mask wherein pixel locations that correspond to a region of interest, i.e., the vascular pattern of the hand of FIG. 1A, are identified as being active and pixels that do not correspond to the vascular pattern are identified as being inactive. The mask may have more than two states.

A "photodetector" or simply "detector" is a device which measures a magnitude of an intensity of the modulated light across pixels in a pattern configured by a spatial light modulator. In various embodiments of the compressed sensing device hereof, the photodetector can be as single (diode) detector or a multi-diode detector and may further comprise an amplifier and an analog-to-digital converter.

A "Spatial Light Modulator (SLM)" is a device in the compressed sensing device positioned along an optical axis where a camera's focal plane array would typically be located. The SLM is controllable such that it can configure a user-specified pattern wherein incoming light is focused, according to that pattern, onto a photodetector. The SLM can be any of: a Digital Micromirror Device, a Transmissive Liquid Crystal, and reflective Liquid Crystal on Silicon, as are generally understood.

Figure 2:
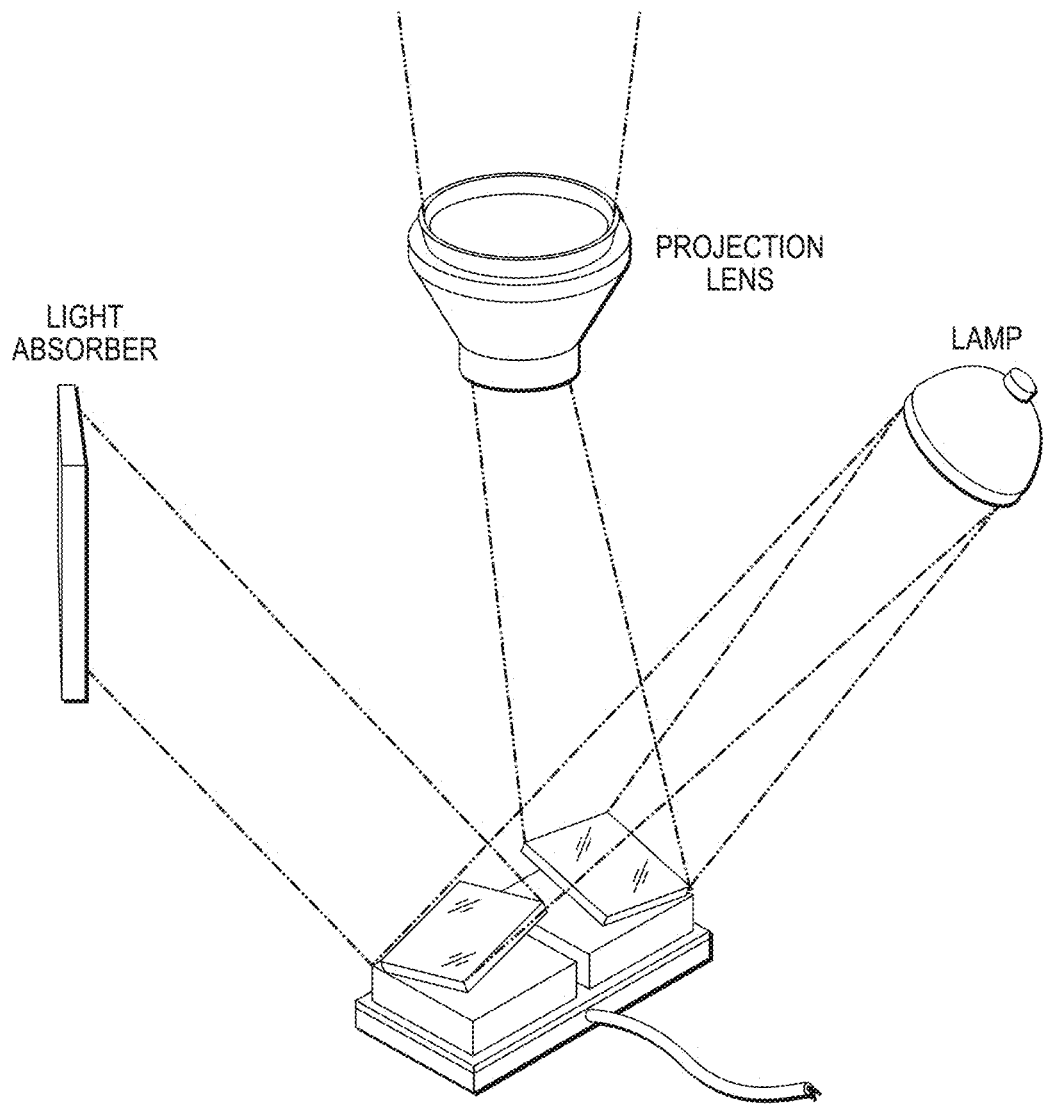
FIG. 2 shows an example Digital Micromirror Device (DMD) pixel in both the ON and OFF states.

"Digital Micromirror Device (DMD)" is an optical semiconductor which has, on its surface, imaging elements comprising microscopic opto-mechanical mirrors arrayed on a two-dimensional grid. Each mirror in the array is referred to as a DMD pixel. The microscopic mirrors are electronically controllable and thus modulate incoming light by toggling a reflectivity thereof by individually tilting (or rotating) the mirrors in one direction or another to achieve an ON/OFF state. In the ON state, light is reflected in a desired direction, typically through a lens or onto a photodetector or both. In the OFF state, the light is directed elsewhere. FIG. 2 shows an example DMD pixel in both the ON and OFF states. By convention, the positive (+) state is ON and the negative (−) state is OFF. The two states are opposite, i.e., if one element is '1' then the other is '0', and vice versa. DMDs are available from a variety of vendors. One vendor which offers a wide array of optical semiconductors is Texas Instruments, Inc. of Dallas, Tex. USA. The reader is directed to: "*Emerging Digital Micromirror Device (DMD) Applications*", by Dana Dudley, Walter Duncan, and John Slaughter, Society of Photo-Optical Instrumentation Engineers (SPIE), Vol. 4985, (2003), which is incorporated herein in its entirety by reference.

Figure 3:
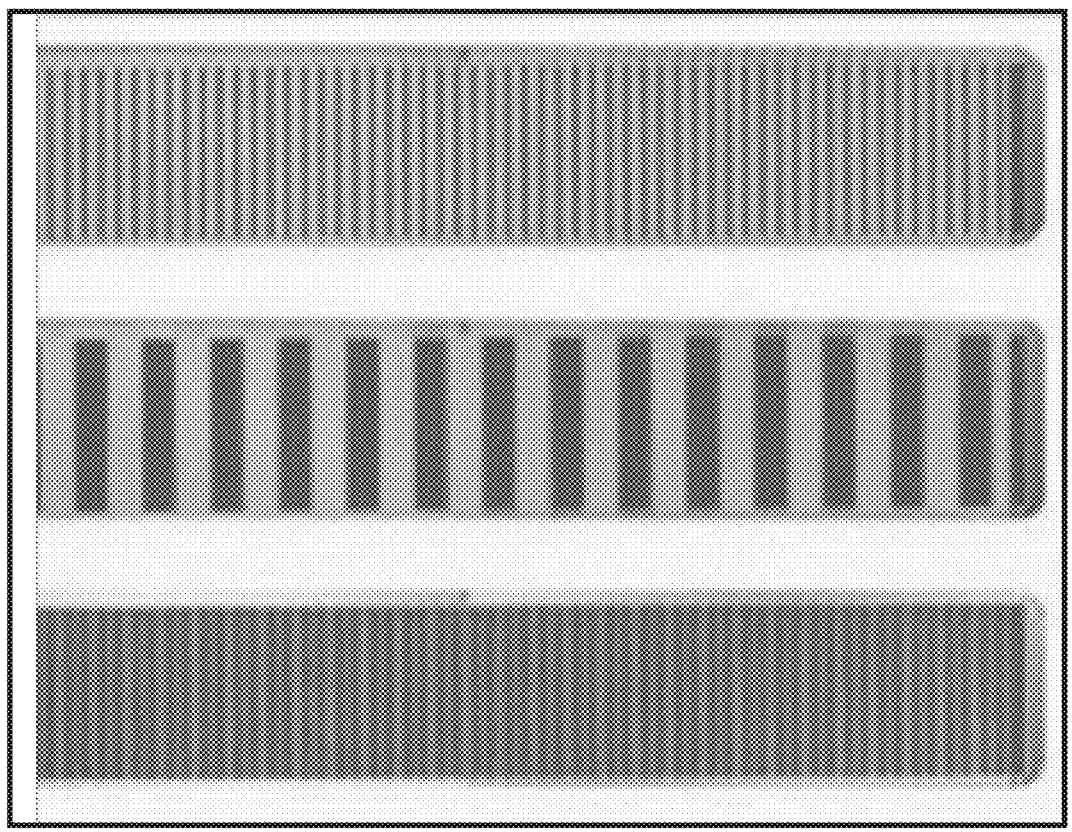
FIG. 3 shows three example Transmissive Liquid Crystal (TLC)s comprising a rectangular two-dimensional array of pixel elements configured to display alternating strips of modulated light in differing widths.

A "Transmissive Liquid Crystal (TLC)" also referred to as a "Liquid Crystal Modulator (LCM)", is a programmable array of liquid crystal elements. Each liquid crystal element in the array is a pixel. The liquid crystal elements are individually electronically controllable and thus the TLC modulates incoming light by toggling a transparency of each TLC pixel to achieve an ON/OFF state. By convention, in the ON state, the liquid crystal element is transparent so light passes therethrough. In the OFF state, the liquid crystal element is opaque so light does not pass therethrough. FIG. 3 shows three example TLCs comprising a rectangular two-dimensional array of displays wherein each of the TLC pixels have been programmed to form strips of differing widths. The darker areas indicate TLC pixels configured to not let light pass therethrough. TLCs are desirable in many applications because of their fast switching times and a high degree of usability over a broad range of visible to infrared wavelength bands. TLCs are available from vendors in various streams of commerce. One vendor is Jenoptic AG which offers TLCs configured as one and two-dimensional liquid crystal arrays. Jenoptic AG is presently listed on the Frankfurt Stock Exchange. Another vendor of spatial light modulation devices which offers a line of liquid crystal on silicon, reflective spatial light modulators is Boulder Nonlinear Systems, Inc. of Lafayette, Colo. USA. Various aspects of spatial light modulators are discussed in the paper entitled: "*Advances In Liquid Crystal spatial light modulators*", by Kipp Bauchert, Steve Serati and Alex Furman, Society of Photo-optical Instrumentation Engineers (SPIE), Vol. 4734, (2002), which is incorporated herein in its entirety by reference.

A "reflective Liquid Crystal on Silicon (LCoS)" refers to a micro-projection or micro-display technology which uses liquid crystals instead of individual mirrors. In LCoS, liquid crystals are applied directly to the surface of a silicon chip coated with an aluminized layer with some type of passivation layer, which is highly reflective. LCoS technology is preferable in many applications because it can produce higher resolution and higher contrast images than standard liquid crystal technologies.

A "spatially reconstructed scene" refers an image reconstructed from measurements obtained by the camera's photodetector. Methods for spatial scene reconstruction from measurements are disclosed in several of the above-incorporated references. Measurements obtained therefrom are used to generate a spatially reconstructed image.

Introduction to Compressive Imaging

"Compressive imaging" is an imaging technique which holds a distinct advantage in detector-noise-limited measurement fidelity (SNR) over conventional camera systems because the total number of photons can be measured using a fewer number of detectors. Rather than spatially sampling an image by collecting the individual pixel data, compressive imaging measures linear projections of the scene. The resulting projections are then processed for diverse applications. A relatively large number of candidate linear projections such as: wavelets, principal components, Hadamard, discrete-cosine, and pseudo-random projections, have been studied in the context of compressive imaging. Linear and nonlinear reconstruction methods have also been explored including linear minimum mean square error using large training sets including a variety of nonlinear reconstruction methods which are based on the compressed sensing theory. See: "*Robust Uncertainty Principles: Exact Signal Reconstruction From Highly Incomplete Frequency Information*", E. Candès, J. Romberg, and T. Tao, IEEE Trans. Information Theory, No. 52, pp. 489-509, (2006), and, "*Compressed Sensing*", D. L. Donoho, IEEE Trans. Information Theory, No. 52, pp. 1289-1306 (2006), both of which are incorporated herein in their entirety by reference.

"Compressed sensing" is a relatively new area in the signal processing arts where one measures a small number of non-adaptive linear combinations of a signal. These measurements are usually much smaller than the number of samples that define the signal. From the small numbers of measurements, the signal is reconstructed by a non-linear process which aims to reduce the overall complexity required by a large variety of measurement systems by introducing signal compression into the measurement process. Essentially, the theory behind compressed sensing is that sparse signal statistics can be recovered from a small number of linear measurements. More generally stated, compressed sensing is any measurement process in which the total number of measurements is smaller than the dimensionality of the signals of interest being explored. The sparse nature of most signals of interest allows high-fidelity reconstructions to be made using a compressed sensing approach. The reader is directed to the following textbooks on this subject: "*Compressed Sensing: Theory and Applications*", Cambridge University Press; 1$^{st}$ Ed. (2012), ISBN-13:978-1107005587 and "*Sparse Representations and Compressive Sensing for Imaging and Vision*", Springer (2013), ISBN-13: 978-1461463801, which are incorporated herein in their entirety by reference. The field of digital imaging is a good candidate for compressed sensing due to the large amount of raw data that can be acquired by arrays of imaging sensors. Compared to conventional imaging, compressive imaging takes advantage of the mathematical framework and theorems of compressed sensing to provide improved performance with reduced complexity. This reduced complexity can be of particular importance, for example, in mid-wave infrared (MWIR) image systems where detector arrays are less developed and more expensive than photodetector array technology used in visible imaging. Compressive imaging provides greater insight into how a high resolution image can be inferred from a small number of measurements.

Figure 4:
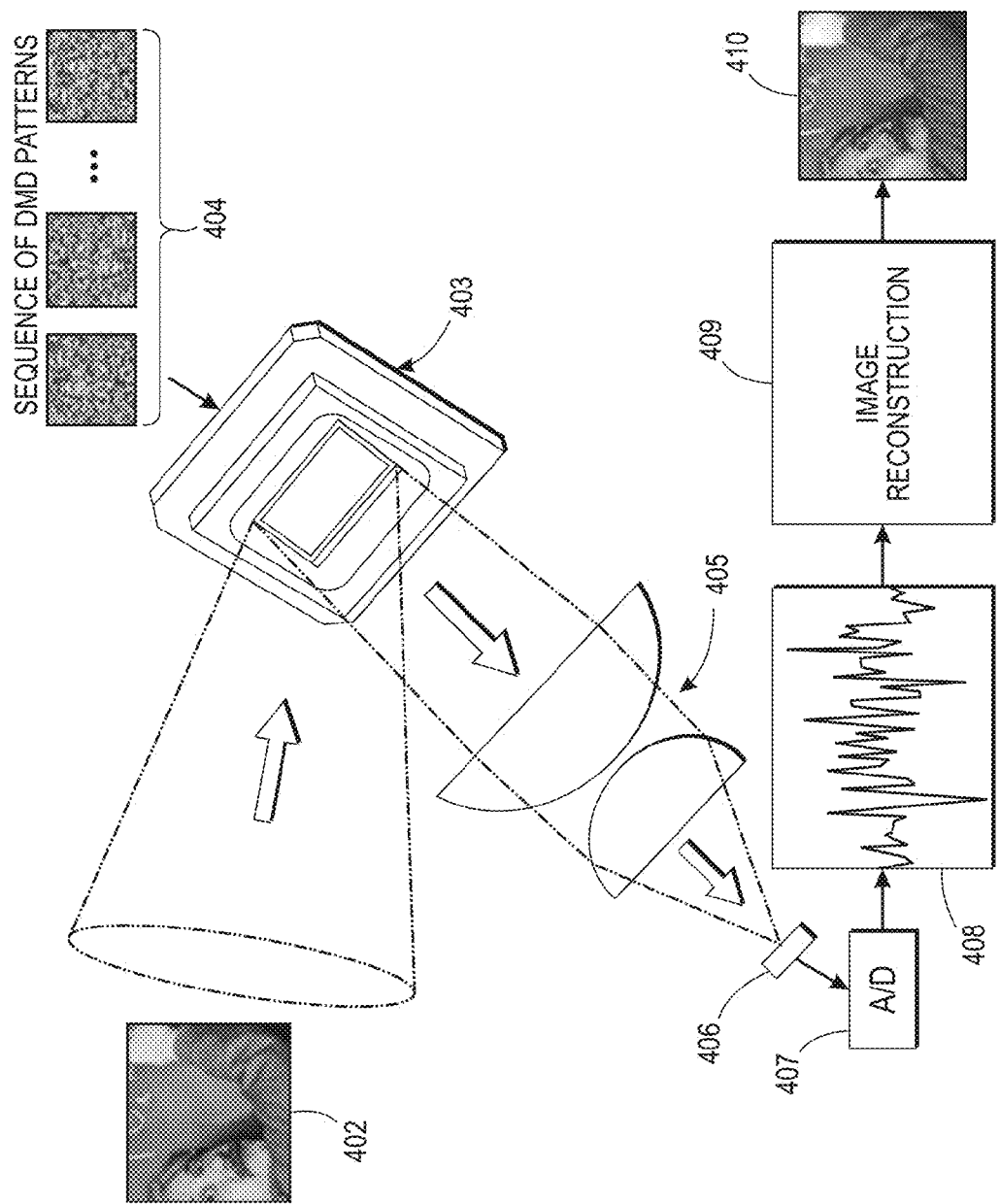
FIG. 4 illustrates one example embodiment of a compressed sensing device wherein incoming light of an image of a scene is directed onto a spatial light modulator which is configured to a sequence of DMD patterns.

A "compressed sensing device" is a single-pixel camera architecture wherein spatial measurements taken by the focal plane array of a conventional camera architecture are effectively replaced by a series of temporal measurements taken by a single (diode) detector or a multi-diode detector. In a compressed sensing device, incoming light of an image is focused onto a spatial light modulator (SLM) such as a Digital Micromirror Device (DMD). The DMD is an array of electronically-controllable micro-mirrors which can be individually configured to tilt in one direction or the other to achieve a desired pattern. When tilted to "select" light, the mirror reflects incoming light onto the detector. When tilted to "reject" light, the mirror reflects light away from the detector. As prescribed by compressive sensing theory, each DMD pattern is configured to select approximately one-half of the incoming light of the image onto the detector. During image acquisition, a series of unique patterns are sequentially provided to the DMD and a series of measurements are obtained. Light energy is concentrated by that DMD mirror pattern onto the diode where the photons of the image are converted to an electrical signal. Each signal, produced as a result of each measurement, is a function of a specific pattern. By rapidly changing the DMD patterns and obtaining measurements therefrom, a time-series signal is obtained. Utilizing a compressed sensing framework, an image reconstruction algorithm reconstructs the original image from the generated time-series measurement data with knowledge of the temporal sequence of patterns. FIG. 4 illustrates one example embodiment compressed sensing device wherein incoming light of an image 402 of a scene is directed onto a spatial light modulator 402 which is configured to a sequence of DMD patterns, collectively at 404. The configured pattern of reflected incoming light is directed to a condenser 405 which focuses the pattern of light onto a photodetector which senses a magnitude of the detected light. A signal is output by the photodetector which is directed to an A/D converter 407 which outputs a signal 408 corresponding to the sensed image. The generated signal 408 is provided to an image reconstruction module 409 which, using a compressed sensing framework, generates a reconstructed image 410 as output.

Figure 6A:
FIG. 6A shows an example image of a scene with an identified region of interest around the face.
Figure 6B:
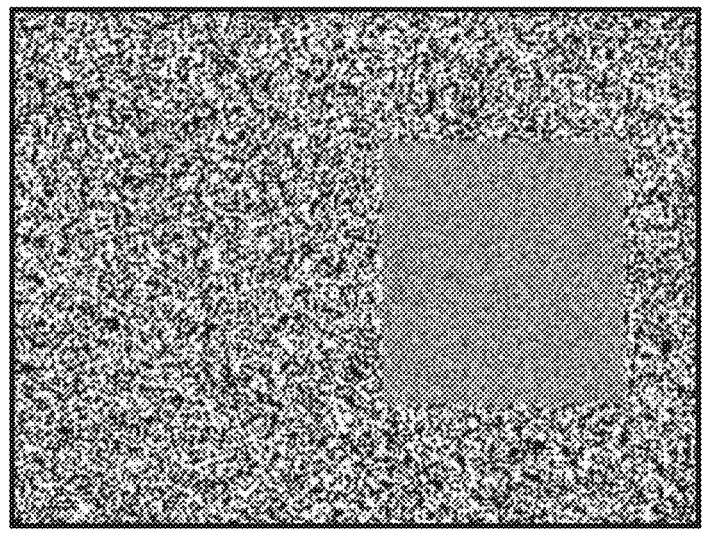
FIG. 6B shows a basis function used in one example embodiment of the present methods having higher spatial resolution on the identified region of interest.

A "compressed sensing framework" is a signal processing technique for reconstructing a signal with solutions found by taking advantage of the signal's sparseness or compressibility in some domain, thereby enabling the entire signal to be generated from relatively few measurements. An underdetermined linear system has more unknowns than equations and generally has an infinite number of solutions. In order to choose a proper solution, constraints are applied. Because many signals are sparse, i.e., they contain many coefficients close to or equal to zero when represented in some domain, the additional constraint of scarcity allows only those solutions with a small number of non-zero coefficients. Not all underdetermined systems have a sparse solution. However, if there is a unique sparse representation to that underdetermined linear system then a compressed sensing framework enables a recovery of that solution. The compressive sensing framework hereof utilizes basis functions on which the scene is projected via the computation of inner products: the resolution of the reconstructed scene will be the same as that of the basis functions: the reconstructed scene will have higher spatial resolution at locations associated with regions of interest, as indicated by the mask, which correspond to areas of higher spatial resolution in the basis functions. In one extreme case, areas of the scene that are outside the regions of interest are not reconstructed at all, or, equivalently, have zero spatial resolution, so that targeted region of interest reconstruction is achieved. Specifically, let x[ ] denote the N-pixel sampled version of the image scene and $\phi_m[\ ]$ is the $m^{th}$ incoherent basis function used for sampling. Each measurement performed by the sensing stage corresponds to the inner product $y_m = <x, \phi_m>$. The sampling basis functions are typically generated via the use of pseudorandom number generators (e.g. Gaussian, Bernoulli, etc.) that produce patterns with close to 50% fill factor. By making the basis functions pseudorandom, the N-pixel sampled scene image x[ ] can typically be reconstructed with significantly fewer samples than those dictated by the Nyquist sampling theorem (i.e., the image can be reconstructed after M inner products w where M is smaller than N. Traditional compressive sensing techniques implement basis functions that lie on a uniform lattice. This necessarily implies that the basis functions themselves have a fixed spatial resolution. According to the teachings hereof, the basis functions exist on more than one lattice, each with a different spatial resolution. FIG. 6A shows an example image of a scene with an identified region of interest around the face, and FIG. 6B shows a basis function with variable spatial resolution according to the teachings herein: the basis function has higher pixel density on the region identified to be of interest. This results in a reconstructed scene whose resolution can vary depending on spatial location. Since it is the objective hereof to recover regions of interest within the scene with a high quality, the resolution of the lattice will be larger on locations associated with the identified region of interest (ROI). The quality difference between ROI and non-ROI areas will depend on the application and/or on rate-distortion requirements.

Flow Diagram of One Embodiment

Figure 5:
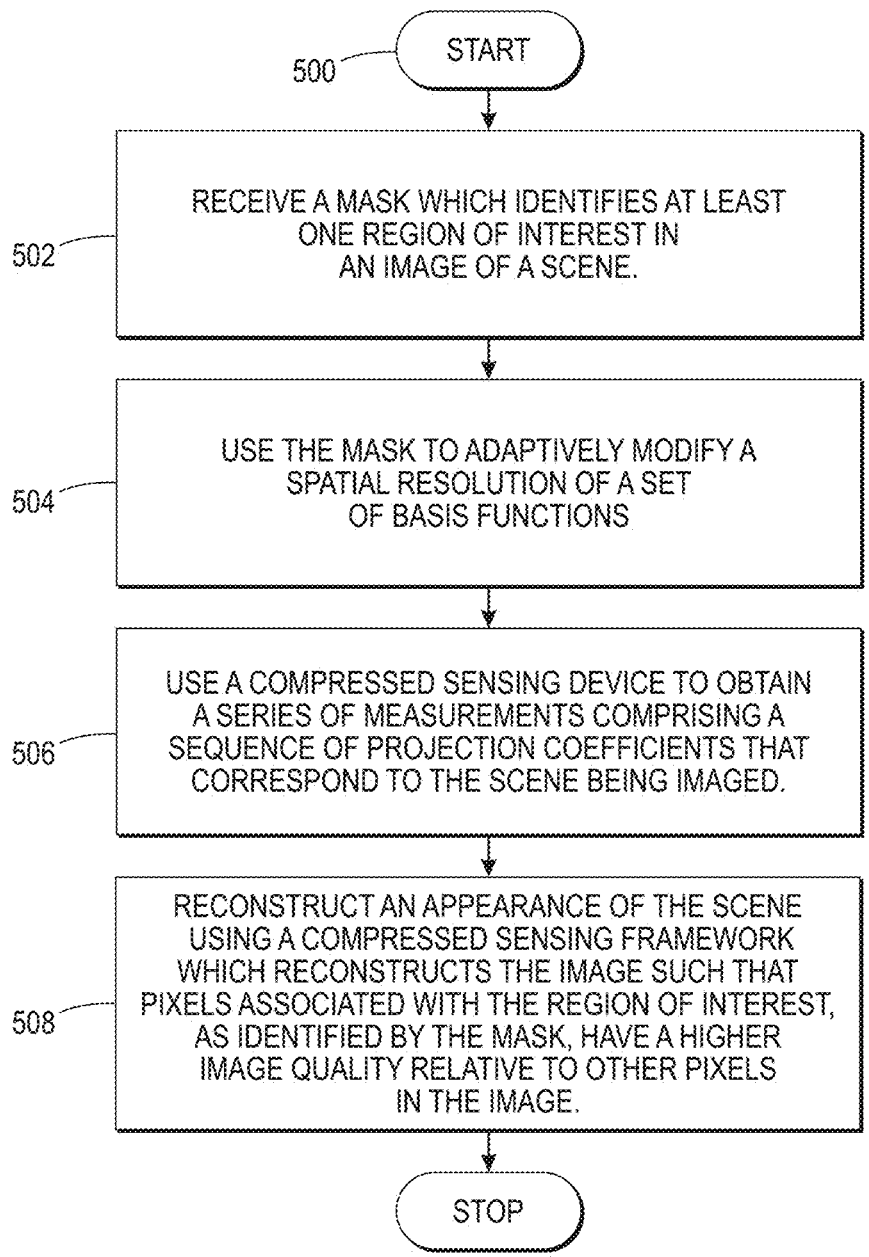
FIG. 5 illustrates one example embodiment of the present method for reconstructing an image of a scene captured using a compressed sensing device.

Reference is now being made to the flow diagram of FIG. 5 which illustrates one example embodiment of the present method for reconstructing an image of a scene captured using a compressed sensing device in accordance with the teachings hereof. Flow processing begins at step 500 and immediately proceeds to step 502.

At step 502, receive a mask which identifies at least one region of interest in an image of a scene. One example mask is shown and described with respect to FIGS. 1A-B. The mask effectively identifies one or more regions of interest in a scene which are desired to be enhanced using the teachings hereof.

At step 504, use the mask to adaptively modify a spatial resolution of a set of basis functions.

At step 506, use a compressed sensing device to obtain a series of measurements comprising a sequence of projection coefficients that correspond to the scene being imaged. Each of the measurements comprises an inner product result.

At step 508, reconstruct an appearance of the scene utilizing a compressed sensing framework which reconstructs the image from the sequence of projection coefficients after M inner products have been sampled. The reconstruction is such that pixels associated with the region of interest, as identified by the mask, have a higher image quality when rendered relative to other pixels of the image. Thereafter, in this embodiment, further processing stops.

It should be appreciated that the flow diagrams hereof are illustrative. One or more of the operations illustrated in the flow diagrams may be performed in a differing order. Other operations may be added, modified, enhanced, or consolidated. Variations thereof are intended to fall within the scope of the appended claims.

Block Diagram of a System Architecture

Figure 7:
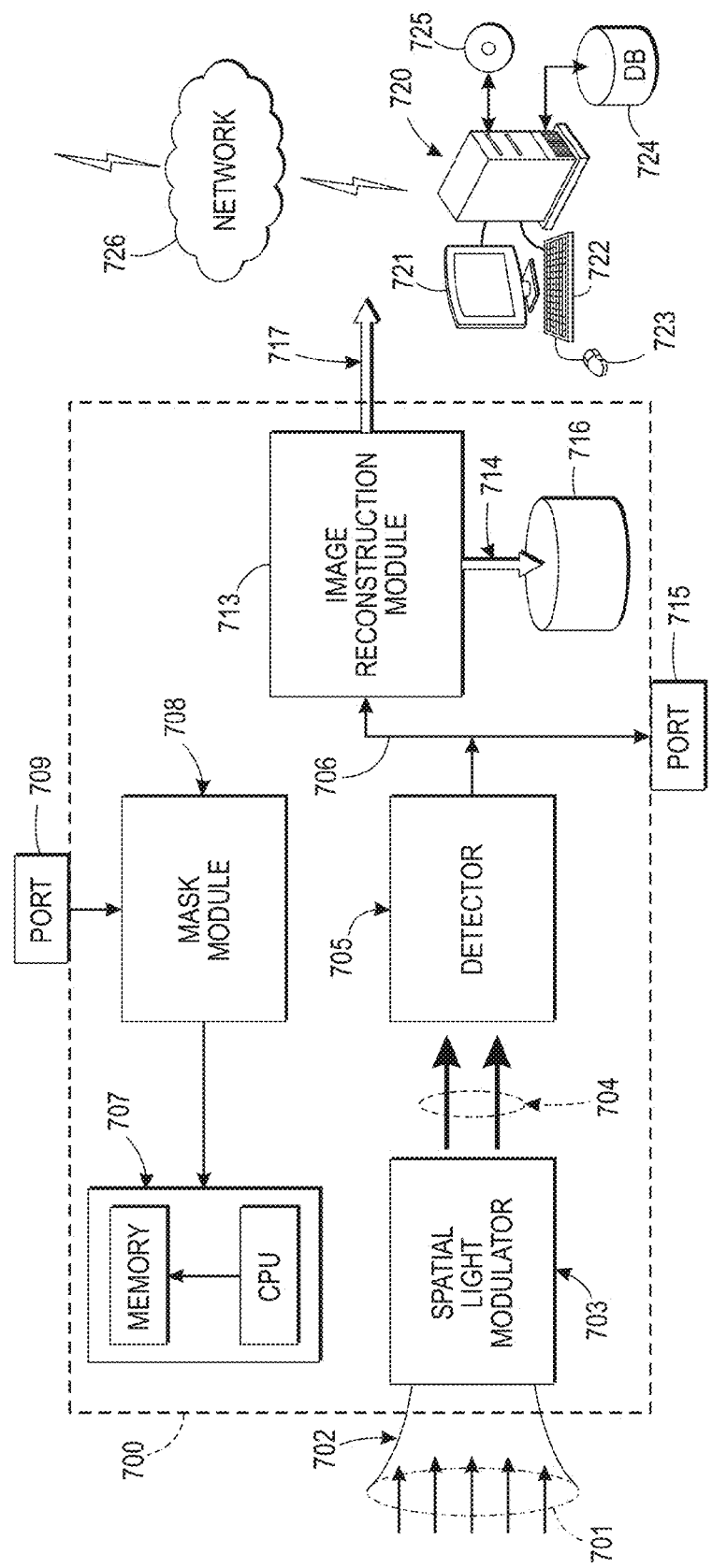
FIG. 7 shows one example embodiment of the present system for performing measurements of a regions of interest and for performing scene reconstruction in accordance with the methods disclosed and discussed with respect to the flow diagram of FIG. 5.

Reference is now being made to FIG. 7 shows one example embodiment of the present system for performing measurements of a region of interest and for performing scene reconstruction in accordance with the methods disclosed and discussed with respect to the flow diagram of FIG. 5.

In the system of FIG. 7, incoming light (collectively at 701) enters the compressed sensing device 700 through a light-gathering aperture 702 and into a spatial light modulator (SLM) 703. The electronically-configurable two-dimensional array of selectably adjustable imaging elements comprising the light modulation device 703 modulates incoming light 701 to modulate a pattern 704 onto Detector 705 which measures a magnitude of an intensity of the modulated pattern 704. Mask Module 708 receives a mask using, for instance, communication port 709 which may comprise a wired or wireless connection, and provides the mask to a Controller 707 shown comprising at least a processor and memory. Controller 707 facilitates a configuration of the electronically-controllable spatial light modulator 703 to modulate incoming light according to attributes of the mask. Each pattern of the spatial light modulator 703 focuses a portion of the incoming light 701 onto a sensing element of Detector 705. Detector 705 outputs a measurement 706. The measurements 706 may be provided as output via port 715 which may comprise, for example, a USB port. Measurements obtained by the Detector are communicated to Image Reconstruction Module 713 wherein a spatial appearance of the scene is reconstructed using a compressed sensing framework. The measurements 706 and the reconstructed image 714 are communicated to storage device 716 and/or provided as output to an external device such as, for example, workstation 720. Any of the values, data, measurements, and results of any of the modules and processing units of the system 700 may be obtained or retrieved via communications bus 717.

Shown in communication with the system of FIG. 7 is a workstation 720. In this embodiment, the workstation is shown comprising a monitor 721, a keyboard 722 and a mouse 723, collectively a user interface. The workstation also has a storage device 724 and a computer readable media 725. Information stored to media 725 can be retrieved using, for example, a CD-ROM drive. Workstation 720 is also placed in communication with one or more remote devices over network 726 using, for example, a network card internal to the workstation. Using the user interface of the workstation, a user thereof may change or control the functionality of any of the modules and processing units comprising the compressed sensing system 700. Images can be displayed on the display device 721 wherein images may be corrected and cropped. Masks can be generated using the workstation and communicated to the mask module 708. Measurements and values generated by the system 700 may be displayed on the display device 721. Intensity values obtained by Detector 705 may be modified by a user of the workstation. The pattern of modulated light may further be communicated to the workstation and displayed on the display device wherein a user can selectively identify a region of interest using, for example, a mouse to make a selection by placing a rubber-band box around one or more areas in an image. The workstation may further be used to identify one or more localized areas of a given region of interest. The identified localized area of interest can be communicated to the mask module, depending on the embodiment. An operator of the workstation may modify the results generated by any of the modules or processing units comprising the system of FIG. 7 as needed and/or re-direct the modified results back to the same or different modules for further processing or re-processing. It should be appreciated that the workstation has an operating system and other specialized software configured to display a variety of numeric values, text, scroll bars, pull-down menus with user selectable options, and the like, for entering, selecting, or modifying information displayed on the display device. In other embodiments, the generated results are provided to a server over the network and communicated to a user/operator such as, a physician, nurse, technician, cardiac specialist, to name a few.

The system of FIG. 7 may further comprise a registration module (not shown) to effectuate a pixel-wise registration between pixels identified by the mask and the image of the reconstructed scene. Such a registration module would generate a registered mask depending on the implementation. The system may further comprise means for toggling between multiple spectral bands in a multi-band operation.

Various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Modules may include software/hardware which may further comprise an operating system, drivers, controllers, and other apparatuses some or all of which may be connected via a network.

One or more aspects of the systems and methods described herein are intended to be incorporated in an article of manufacture which may be shipped, sold, leased, or otherwise provided separately either alone or as part of a product suite. The above-disclosed features and functions or alternatives thereof, may be combined into other systems or applications. Presently unforeseen or unanticipated alternatives, modifications, variations, or improvements may become apparent and/or subsequently made by those skilled in the art and, further, may be desirably combined into other different systems or applications. Changes to the above-described embodiments may be made without departing from the spirit and scope of the invention. The teachings of any printed publications including patents and patent applications, are each separately hereby incorporated by reference in their entirety.

What is claimed is:

1. A method for reconstructing an image of a scene captured using a compressed sensing device, the method comprising:
 obtaining measurements of a scene using a spatial light modulator configuring a plurality of spatial patterns according to a set of basis functions, each entry of the set of basis functions generated from a pseudorandom number generator and each basis function in the set of basis functions existing on more than one lattice, each basis function having a spatial resolution that is variable, the spatial resolution of said set of basis functions being adaptively modified according to attributes of a mask which identifies at least one region of interest in an image of said scene, each pattern of said spatial light modulator focuses a portion of the incoming light of said scene onto at least one detector which samples sequential measurements of light focused thereon, said measurements comprising a sequence of projection coefficients corresponding to said scene and said set of basis functions; and
 reconstructing an appearance of said scene utilizing a compressed sensing framework which reconstructs an image from said sequence of projection coefficients such that pixels associated with said at least one region of interest as identified by the mask have a higher spatial resolution relative to other pixels of said image.

2. The method of claim 1, wherein said spatial light modulator comprises one of: a digital micromirror device comprising a two dimensional array of electronically controllable micro-mirrors, a transmissive liquid crystal, and a reflective liquid crystal on silicon.

3. The method of claim 1, wherein said detector comprises at least one diode, an amplifier, and an analog-to-digital converter.

4. The method of claim 1, wherein said regions of interest are identified in said image using any of: pixel classification, object identification, facial recognition, color, texture, spatial features, spectral information, pattern recognition, and a user input.

5. The method of claim 1, wherein said basis functions are generated via the pseudorandom number generator capable of producing patterns with close to 50% fill.

6. The method of claim 1, wherein said detector is configured to detect any of: an infrared wavelength band, and a visible wavelength band.

7. The method of claim 1, wherein each of said measurements comprises an inner product result $y_m = \langle x, \phi_m \rangle$, where x denotes an N-dimension vector representing the N-pixel sampled version of said scene and $\phi_m$ denotes the $m^{th}$ incoherent basis function used for sampling, a series of said measurements comprising a sequence of projection coefficients corresponding to said scene.

8. The method of claim 7, wherein reconstructing an appearance of said scene utilizes a compressed sensing framework which reconstructs said image from said sequence of projection coefficients after M inner products have been sampled, where M is smaller than N.

9. A method comprising: receiving a mask that identifies at least one region of interest in an image of a scene;
 obtaining measurements of the scene using a spatial light modulator that configures a plurality of spatial patterns according to a set of basis functions, each entry of the set of basis functions generated from a pseudorandom number generator and each basis function in the set of basis functions existing on more than one lattice, with each basis function having a different spatial resolution;
 wherein said obtaining measurements further comprises:
 (i) using the mask to adaptively modify the spatial resolution of at least one basis function in the set of basis functions; and
 (ii) sampling sequential measurements of incoming light of the scene focused onto a detector using a plurality of the spatial patterns; each sequential measurement having a sequence of projection coefficients corresponding to the scene and the set of basis functions; and
 reconstructing the image of the scene from the sequence of projection coefficients, where the at least one region of interest in the reconstructed image of the scene has a higher resolution then regions outside the at least one region of interest.

10. The method of claim 9, wherein said spatial light modulator comprises one of: a digital micromirror device comprising a two dimensional array of electronically controllable micro-mirrors, a transmissive liquid crystal, and a reflective liquid crystal on silicon.

11. The method of claim 9, wherein said detector comprises at least one diode, an amplifier, and an analog-to-digital converter.

12. The method of claim 9, wherein said regions of interest are identified in said image using any of: pixel classification, object identification, facial recognition, color, texture, spatial features, spectral information, pattern recognition, and a user input.

13. The method of claim 9, wherein said basis functions are generated via the pseudorandom number generator capable of producing patterns with close to 50% fill.

14. The method of claim 9, wherein said detector is configured to detect any of: an infrared wavelength band, and a visible wavelength band.

15. The method of claim 9, wherein each of said measurements comprises an inner product result $y_m = \langle x, \phi_m \rangle$, where x denotes an N-dimension vector representing the N-pixel sampled version of said scene and $\phi_m$ denotes the $m^{th}$ incoherent basis function used for sampling, a series of said measurements comprising a sequence of projection coefficients corresponding to said scene.

16. The method of claim 15, wherein reconstructing the image of the scene utilizes a compressed sensing framework which reconstructs said image from said sequence of projection coefficients after M inner products have been sampled, where M is smaller than N.

\* \* \* \* \*